US006863307B2

(12) United States Patent
Kim

(10) Patent No.: US 6,863,307 B2
(45) Date of Patent: Mar. 8, 2005

(54) DRIVER'S KNEE PROTECTING APPARATUS OF A VEHICLE

(75) Inventor: Hyun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 161 days.

(21) Appl. No.: 10/322,137

(22) Filed: Dec. 17, 2002

(65) Prior Publication Data

US 2003/0111833 A1 Jun. 19, 2003

(30) Foreign Application Priority Data

Dec. 19, 2001 (KR) ........................................ 2001-81085

(51) Int. Cl.[7] .............................. B60R 21/05; B62D 1/19
(52) U.S. Cl. ..................................... 280/777; 280/750
(58) Field of Search ............................... 280/750–753, 280/777; 74/492, 493

(56) References Cited

U.S. PATENT DOCUMENTS

| 3,498,402 A | * | 3/1970 | Barenyi ..................... 180/90 |
| 3,832,911 A | * | 9/1974 | Daniel et al. .................. 74/492 |
| 3,888,506 A | | 6/1975 | Haas |
| 3,897,848 A | | 8/1975 | Arnstson et al. |
| 3,907,326 A | | 9/1975 | Arntson et al. |
| 3,938,821 A | | 2/1976 | Haas et al. |
| 4,194,762 A | | 3/1980 | Sudo |
| 4,834,422 A | | 5/1989 | Oikawa et al. |
| 4,903,988 A | | 2/1990 | Jambor et al. |
| 4,946,192 A | | 8/1990 | Kuwahara |
| 5,096,223 A | * | 3/1992 | Tekelly et al. ............... 280/748 |
| 5,280,956 A | * | 1/1994 | Tanaka et al. ............... 280/777 |
| 6,467,807 B2 | * | 10/2002 | Ikeda et al. .................. 280/775 |
| 2001/0015551 A1 | | 8/2001 | Muramatsu et al. |
| 2002/0024210 A1 | * | 2/2002 | Nomura et al. .............. 280/777 |

FOREIGN PATENT DOCUMENTS

| EP | 0 661 200 | 9/1997 | |
| EP | 0 838 387 | 12/2001 | |
| JP | 63082851 A | * 4/1988 | ......... B60R/21/045 |
| JP | 01009048 A | * 1/1989 | ........... B60R/21/05 |
| WO | WO 00/00368 | 1/2000 | |

* cited by examiner

*Primary Examiner*—Paul N. Dickson
*Assistant Examiner*—Laura B. Rosenberg
(74) *Attorney, Agent, or Firm*—Morgan Lewis & Bockius LLP

(57) ABSTRACT

The invention relates to a driver's knee protecting apparatus of a vehicle which can allow a shroud to rotate against a steering column at the time of a collision, thereby dispersing and reducing the force of impact when the driver's knees are bumped against the shroud.

7 Claims, 2 Drawing Sheets

DRIVER'S KNEE PROTECTING APPARATUS OF A VEHICLE

FIELD OF THE INVENTION

The present invention relates to an apparatus for protecting the knees of a driver. More particularly, the present invention relates to an apparatus adapted to enable a shroud to rotate relative to a steering column at the time of collision and dissapate impact when the knees bump against the shroud, thereby reducing the degree of injury inflicted to the knees.

BACKGROUND OF THE INVENTION

Generally, when a collision occurs while a vehicle is in motion, the external force causes the upper body of a driver to lunge forward. This causes the driver's chest or face to contact the steering wheel, resulting in injury to the driver. Injury may also occur to the driver's legs, particularly the knees or shinbones, when contact is made between the drivers lower extremities and the dash panel or steering column.

Typically a shroud is installed that wraps around the steering column to conceal the steering column and absorb impact to the driver's knees to a certain degree. The shroud is conventionally made of a thin plastic material that simply wraps around the steering column providing only a nominal impact absorbing effect. Furthermore, the shroud often breaks up upon impact of the driver's knees at the time of a collision. Additionally, the steering column is generally made of steel and shaped in the form of a sharp-edged rectangle.

A polypropylene shock absorbing padding has been inserted on the internal side of the shroud in an attempt to absorb a greater impact. However, the pad is ineffective in absorbing most impacts. This is particularly the case when an electromotive tilting steering column is used in the vehicle because the space available for installing the pad is limited and thus, the pad becomes to thin.

Furthermore, in the event of an offset frontal collision, the impact is likely to cause the vehicular body to spin resulting in the legs of the driver being thrown laterally. This lateral movement causes the driver's legs to bump against the steering column. Therefore, an adequate knee protection device must also guard against contact with the side of the steering column.

SUMMARY OF THE INVENTION

The present invention provides a knee protecting apparatus, which can effectively and sufficiently absorb an impact when the knees of the driver bump against a shroud at the time of an offset collision. Therefore, reducing the degree of injury to the knees by minimizing direct contact against the steering column even when the shroud is damaged.

According to an embodiment of the present invention, an internal cylinder is wrapped around and fixed to the steering column. An external cylinder is rotatably installed at the external side of the internal cylinder and fixed at a shroud. A fixing state switching means restrains rotation of the external cylinder against the internal cylinder while the vehicle is driven at its normal running state, but enables the external cylinder to rotate with respect to the internal cylinder at the time of a collision.

BRIEF DESCRIPTION OF THE DRAWINGS

The features and advantages of the present invention will be more apparent from the following detailed description with reference to the accompanying drawings in which.

DETAILED DESCRIPTION OF THE INVENTION

Figure 1:
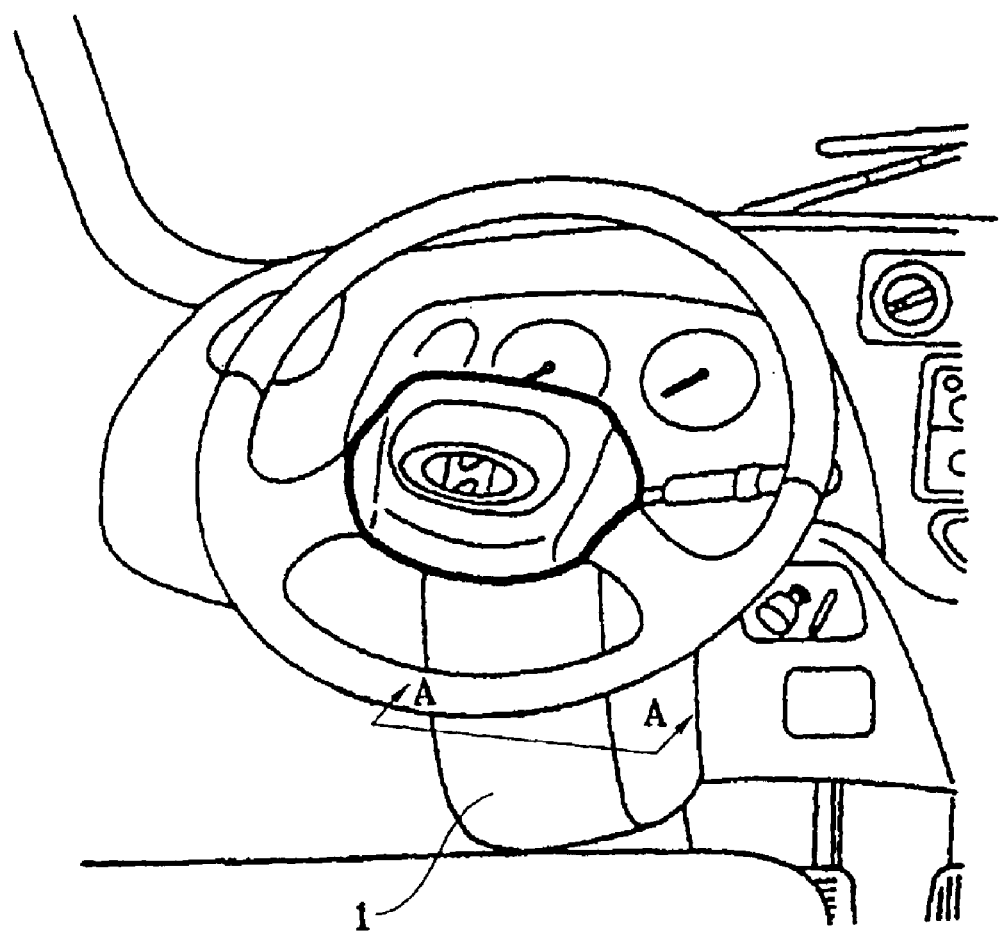
FIG. 1 is a perspective view illustrating the front part of a driver's seat.
Figure 2:
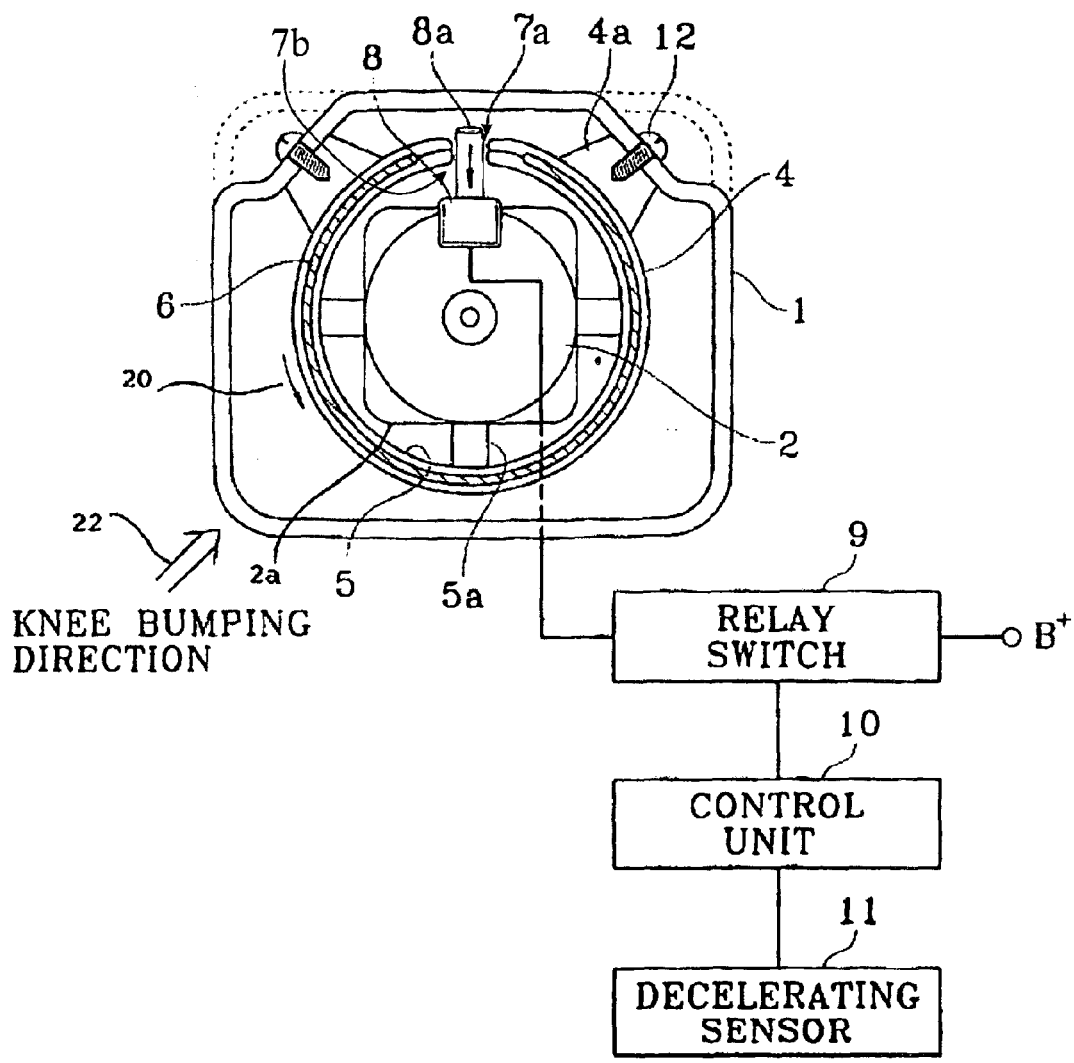
FIG. 2 is a cross-sectional view illustrating a steering column and a shroud to which a knee protecting apparatus of an embodiment of the present invention is applied.

In one embodiment of the invention, as shown in FIG. 2, an external cylinder 4 and an internal cylinder 5 are provided between a shroud 1 and a steering column 2. The external cylinder 4 and internal cylinder 5 are both circular cylinders wrapped around the steering column 2. In a preferred embodiment of the invention, the external and internal cylinders 4 and 5 are both made of a plastic material. The material is preferrably stronger than the material of the shroud 1 and strong enough to deform itself to the direction of the force of impact thereby absorbing some of the impact when contacted by the driver's knees. The internal cylinder 5 is positioned inside the external cylinder 4. It is preferrable that the gap, formed between the two cylinders 4 and 5, contains a highly viscous type of silicone oil.

The external cylinder 4 is fixedly installed at the shroud 1 with a bracket 4a. In a preferred embodiment, the bracket 4a is integrally formed at the external surface of the external cylinder 4 and attached to the shroud 1 by way of a screw 12. The internal cylinder 5 is mounted at the steering column 2 with a bracket 5a that is integrally formed around the internal surface of the internal cylinder 5.

The bracket 5a of the internal cylinder 5 is formed to prevent the internal cylinder 5 from rotating against the steering column 2. However, in a preferred embodiment, the internal cylinder 5 is not fixed in an instrumental manner. The attachment of the plurality of brackets 5a to the external circumference of the steering column 2 effectively prevents rotation of the internal cylinder 5 around the steering column 2.

In a further preferred embodiment, the fixing state switch includes an actuator 8 having a rod 8a that is inserted by way of an internal solenoid effect when power is supplied to the steering column 2. Furthermore, holes 7a and 7b are formed through the external and internal cylinders 4 and 5, respectively, for insertion of the rod 8a while power is not supplied to the actuator 8. Also, a switching means is provided that turns the power on or off to the actuator 8, a decelerating sensor 11 to sense a colliding state of a vehicle, and a control unit 10 that controls the switching means according to the signal from the decelerating sensor 11.

It is preferable that the switching means is constructed with a relay switch 9 that is turned on or off by the control unit 10 to supply battery power to the actuator 8.

In an alternative embodiment, the fixing state switching means can be a fixing clip or the like. The fixing clip is inserted into the holes penetrating through the external and internal cylinders, thereby making the external cylinder 4 rotate against the internal cylinder 5 in response to a predetermined impact.

In yet another alternative embodiment, the control unit 10 and the decelerating sensor 11 are a controller and a sensor associated with a standard airbag protection unit of a vehicle.

Hereinafter, the effects of the present invention will be described.

In use, when a vehicle collides while it is in motion, the decelerating sensor 11 senses the collision and sends a collision sensing signal to the control unit 10. The control unit 10, having received the vehicle collision sensing signal from the decelerating sensor 11 turns on the relay switch 9, thereby supplying battery (B+) power to the actuator 8. The actuator 8, to which the power is supplied, removes the rod 8a from the holes 7a and 7b, by way of the internal solenoid effect, whereby the rod 8a is taken out of the holes 7a and 7b to make the external and internal cylinders 4 and 5 reciprocally rotate.

Therefore, when the driver's knees bump against the shroud 1, the shroud 1 rotates in the direction of collision. The external cylinder 4 simultaneously rotates along with the shroud 1, whereas the internal cylinder 5 remains fixed to the steering column 2.

The internal cylinder 5 and the external cylinder 4 form a gap therebetween. In a preferred embodiment, the gas is filled with highly viscous silicone oil 6. The highly viscous silicone oil 6 functions to resist the external cylinder 4 from rotating against the internal cylinder 5. Therefore, reducing the impact on the driver's knees.

In use, following an offset vehicle collision, the vehicle body rotates which makes the shroud 1 rotate as shown by the single arrow (→) 20 (FIG. 2), and the driver's knees move in the direction indicated by the double arrow (⇒) 22 (FIG. 2) and contact the shroud 1. The shroud 1 then receives the force of the driver's knees in a slanted angle, thereby dispersing and reducing the impact. As a result, the impact on the driver's knees will be reduced due to the shock absorbing effect of the silicone oil 6.

In use, even if the impact is so great that the driver's knees break through the shroud 1 the driver's knees will not come in direct contact with the edge part 2a of the steel steering column 2 because of the internal and external cylinders 5 and 4, respectively. Furthermore, since the internal and external cylinders 5 and 4, respectively, provide a smooth arch surface and are typically made of a plastic material, they reduce the impact to the driver's knees.

What is claimed is:

1. A driver's knee protecting apparatus, comprising:

an internal cylinder wrapped around a steering column and fixed at the steering column;

an external cylinder rotatably installed around the internal cylinder and fixed at a shroud; and a fixing state switching means to restrain the rotation of the external cylinder against the internal cylinder while the vehicle is driven at its normal running state but to enable the external cylinder to rotate relative to the internal cylinder at the time of a car accident.

2. The apparatus as defined in claim 1, wherein a viscous oil is disposed between said external and internal cylinders.

3. The apparatus as defined in claim 1, wherein the fixing state switching means comprises:

a hole penetrated through each of said external and internal cylinders;

an actuator mounted at said steering column to enable a rod to be inserted into or ejected out of the holes in said external and internal cylinders;

a switch that turns on or off the power to the actuator;

a decelerating sensor to sense a colliding state of the vehicle; and a control unit to control the switch according to a signal of the decelerating sensor.

4. The apparatus as defined in claim 1, wherein said external and internal cylinders are made of a plastic material, strong enough to be deformed to absorb shock following contact with a driver's knees.

5. An apparatus for protecting a driver's knees in a vehicle, comprising:

a shroud configured to house a steering column in the vehicle;

an internal cylinder defining a hole therethrough wherein said internal cylinder has an external surface and an internal surface and wherein said internal surface is fixidly coupled with said steering column;

an external cylinder defining a hole therethrough wherein said external cylinder has an external surface and an internal surface and wherein said internal surface is rotatably coupled with said external surface of said internal cylinder and wherein said external surface of said external cylinder is fixidly coupled with said shroud;

a rod removeably inserted through said holes in said internal cylinder and said external cylinder;

a deceleration sensor configured to detect a vehicle collision and send a signal;

a control unit configured to receive the signal from said deceleration sensor; and an actuator configured to insert or remove said rod from said holes in said internal cylinder and said external cylinder.

6. The apparatus of claim 5, wherein said rotatable coupling of said internal cylinder with said external cylinder comprises viscous oil.

7. The apparatus of claim 5, wherein said rotatable coupling of said internal cylinder with said external cylinder comprises a bearing.

* * * * *